(12) United States Patent
Grosjean et al.

(10) Patent No.: US 12,045,405 B2
(45) Date of Patent: Jul. 23, 2024

(54) METHOD FOR COMPARING A PLURALITY OF STORAGE ELEMENTS

(71) Applicant: EM Microelectronic-Marin SA, Marin (CH)

(72) Inventors: Sylvain Grosjean, Les Fins (FR); Jérémy Schlachter, Gampelen (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 18/255,618

(22) PCT Filed: Dec. 14, 2021

(86) PCT No.: PCT/EP2021/085631
§ 371 (c)(1),
(2) Date: Jun. 2, 2023

(87) PCT Pub. No.: WO2022/129008
PCT Pub. Date: Jun. 23, 2022

(65) Prior Publication Data
US 2024/0004487 A1    Jan. 4, 2024

(30) Foreign Application Priority Data

Dec. 14, 2020 (EP) .................................. 20213899

(51) Int. Cl.
*G06F 3/038*    (2013.01)
*G06F 3/03*    (2006.01)
*G06F 3/0354*    (2013.01)

(52) U.S. Cl.
CPC ............ *G06F 3/038* (2013.01); *G06F 3/0304* (2013.01); *G06F 3/03543* (2013.01)

(58) Field of Classification Search
CPC ..... G06F 3/038; G06F 3/0304; G06F 3/03543
See application file for complete search history.

(56) References Cited

U.S. PATENT DOCUMENTS 5,854,482 A * 12/1998 Bidiville ............. G06F 3/03543
250/221
2004/0130532 A1    7/2004 Gordon et al.

FOREIGN PATENT DOCUMENTS

WO    WO 03/071345 A1    8/2003

OTHER PUBLICATIONS

International Search Report issued on Mar. 17, 2022 in PCT/EP2021/085631 filed on Dec. 14, 2021, 2 pages.

* cited by examiner

*Primary Examiner* — Yaron Cohen
(74) *Attorney, Agent, or Firm* — Oblon, McClelland, Maier & Neustadt, L.L.P.

(57) ABSTRACT

An embodiment of the invention relates to a method for sensing a displacement of a pointing device, like a mouse. The pointing device includes at least one light source configured to illuminate a surface, at least one first secondary photodetector, at least one second secondary photodetector and at least one primary photodetector. Each individual value of photodetectors is weighted and compared to sense the displacement of the pointing device by comparing a plurality of storage elements.

11 Claims, 3 Drawing Sheets

METHOD FOR COMPARING A PLURALITY OF STORAGE ELEMENTS

TECHNICAL FIELD

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical motion sensing device including a photodetector array for measuring the varying intensity pattern of a portion of a surface which is illuminated with radiation of a light source and for extracting information about the relative motion between the photodetector array and the illuminated portion of the surface.

STATE OF THE ART

Optical pointing devices incorporating a light source are already known in the art. Such light source allows optical pointing devices such as mice to work on a much wider variety of surfaces. However, the light results in a received image that contains generally high spatial frequencies especially. This high frequency content leads to spatial aliasing due to beyond undersampled (in the spatial domain). This aliasing leads to several bad effects, such as loss of resolution or apparent "reverse" motion (the "wagon-wheel in motion pictures" effect). One alternative to deal with the higher spatial frequency content is to create smaller pixels (higher spatial capability in the imager). But, two major problems arise with smaller pixels that are a lower mouse-speed/acceleration capability and a lower sensitivity to light (less collection area in the pixel).

SUMMARY OF THE INVENTION

The present invention relates to a method for comparing a plurality of storage elements of a pointing device; said pointing device comprising a ground, an amplifier, a plurality of auxiliary source, a at least one main switching element, and a plurality of auxiliary switching elements; said plurality of storage elements being configured to be connected to said ground, at least one main source and a plurality of auxiliary source via said at least one main switching element and/or said plurality of auxiliary switching elements; said method comprising at least one:
  Reset phase; said at least one reset phase sets a primary charge on said amplifier by switching said at least one main switching element and said plurality of auxiliary switching elements; and,
  Comparison phase; said at least one comparison phase sets a secondary charge on said amplifier by switching said at least one main switching element and said plurality of auxiliary switching elements, and said at least one comparison phase compares said secondary charge and said primary charge.

Thanks to the arrangement, said method may compare a plurality of storage elements of a pointing device such as to reveal interesting information when surface local non-uniformity is smaller than the spot gradient and may generate dynamics edges, such as to recognize a moving image and thus improve mouse displacement evaluation.

According to an embodiment, said plurality of storage elements comprises at least one main storage element, and said pointing device comprises at least one main source, a at least one main switching element configured to connect said at least one main storage element to said at least one main source; wherein said at least one reset phase switches said at least one main switching element such as to connect said at least one main storage element to said at least one main source.

According to an embodiment, said plurality of storage elements comprises at least one primary auxiliary storage element, at least one secondary auxiliary storage element, and wherein said plurality of auxiliary switching elements comprises at least one first primary auxiliary switching element configured to connect said at least one primary auxiliary storage element to said ground, at least one first secondary auxiliary switching element configured to connect said at least one secondary auxiliary storage element to said plurality of auxiliary source; wherein said at least one reset phase switches said at least one first primary auxiliary switching element such as to connect said at least one primary auxiliary storage element to said ground, and said at least one first secondary auxiliary switching element such as to connect said at least one secondary auxiliary storage element to said plurality of auxiliary source.

Thanks to one of those arrangements, said plurality of storage elements and said at least one main storage element may be connected to said at least one main source such as to set said primary charge.

According to an embodiment, said at least one comparison phase switches said at least one main switching element such as to disconnect said at least one main storage element of said at least one main source.

According to an embodiment, said plurality of auxiliary switching elements comprises at least one second primary auxiliary switching element configured to connect said at least one primary auxiliary storage element to said plurality of auxiliary source, at least one second secondary auxiliary switching element configured to connect said at least one secondary auxiliary storage element to said ground; wherein said at least one comparison phase switches said at least one second primary auxiliary switching element such as to connect said at least one primary auxiliary storage element to said plurality of auxiliary source, and said at least one second secondary auxiliary switching element such as to connect said at least one secondary auxiliary storage element to said ground.

According to an embodiment, said plurality of storage elements comprises at least one tertiary auxiliary storage element, and wherein said plurality of auxiliary switching elements comprises at least one first tertiary auxiliary switching element configured to connect said at least one tertiary auxiliary storage element to said plurality of auxiliary source; wherein said at least one reset phase switches said at least one first tertiary auxiliary switching element such as to connect said at least one tertiary auxiliary storage element to said plurality of auxiliary source.

According to an embodiment, said plurality of auxiliary switching elements comprises at least one second tertiary auxiliary switching element configured to connect said at least one tertiary auxiliary storage element to said ground; wherein said at least one comparison phase switches said at least one second tertiary auxiliary switching element such as to connect said at least one tertiary auxiliary storage element to said ground.

Thanks to one of those arrangements, said plurality of storage elements and said at least one main storage element may compare said primary charge and said secondary charge.

According to an embodiment, said at least one reset phase sums charge of said at least one primary auxiliary storage element, charge of said at least one secondary auxiliary storage element, said at least one tertiary auxiliary storage element and/or charge of said at least one main storage element such as to set said primary charge on said amplifier.

Thanks to this arrangement, said primary charge may be set.

According to an embodiment, said at least one comparison phase adds up charge of said at least one primary auxiliary storage element, charge of said at least one secondary auxiliary storage element, said at least one tertiary auxiliary storage element and/or charge of said at least one main storage element such as to compare said secondary charge and said primary charge by applying said secondary charge on said amplifier.

Thanks to this arrangement, said secondary charge may be compared to said primary charge.

According to an embodiment, said plurality of storage elements comprises at least one offset storage element and at least one trim storage element, and said pointing device comprises at least one at least one first offset switching element configured to connect said at least one offset storage element to said ground and at least one first trim switching element configured to connect said at least one trim storage element to said ground; wherein said at least one reset phase switches said at least one at least one first offset switching element such as to connect said at least one offset storage element to said ground and said at least one first trim switching element such as to connect said at least one trim storage element to said ground.

According to an embodiment, said pointing device comprises at least one offset source, at least one at least one second offset switching element configured to connect said at least one offset storage element to said at least one offset source and at least one second trim switching element configured to connect said at least one trim storage element to said plurality of auxiliary source; wherein said at least one reset phase switches said at least one at least one second offset switching element such as to connect said at least one offset storage element to said at least one offset source and said at least one second trim switching element such as to connect said at least one trim storage element to said plurality of auxiliary source.

Thanks to one of those arrangements, an offset and/or a trim may be applied.

BRIEF DESCRIPTION OF THE DRAWINGS

The foregoing and other purposes, features, aspects and advantages of the invention will become apparent from the following detailed description of the embodiments, given by way of illustration and not limitation with reference to the accompanying drawings, in which.

DESCRIPTION OF THE INVENTION

Figure 1:
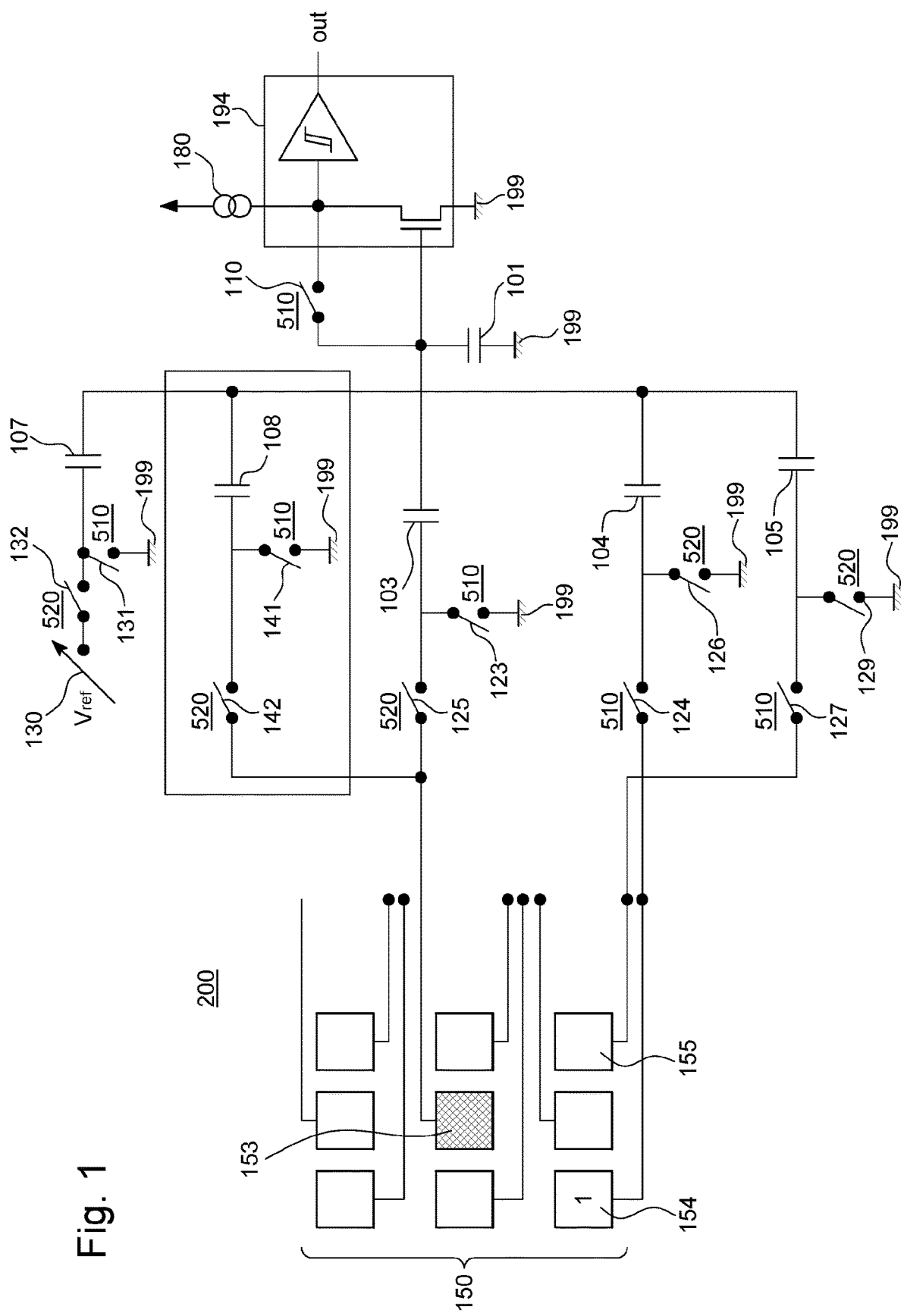
FIG. 1 illustrates a method for comparing a plurality of storage elements.

The present invention relates to a method 500 for comparing a plurality of storage elements 100 of a pointing device 200. Said pointing device 200 comprises a ground 199, an amplifier 190, a plurality of auxiliary source 150, at least one main switching element 110, and a plurality of auxiliary switching elements 120. As the skilled man in the art may understand, said plurality of auxiliary source 150 may be a plurality of photodetector 150, wherein each single auxiliary source 150 may represent a single photodetector 150 illuminated by a reflected light by at least one light source comprised by said pointing device 200.

Said plurality of storage elements 100 being configured to be connected to said ground 199, at least one main source 180 and a plurality of auxiliary source 150 via said at least one main switching element 110 and/or said plurality of auxiliary switching elements 120

Figure 2:
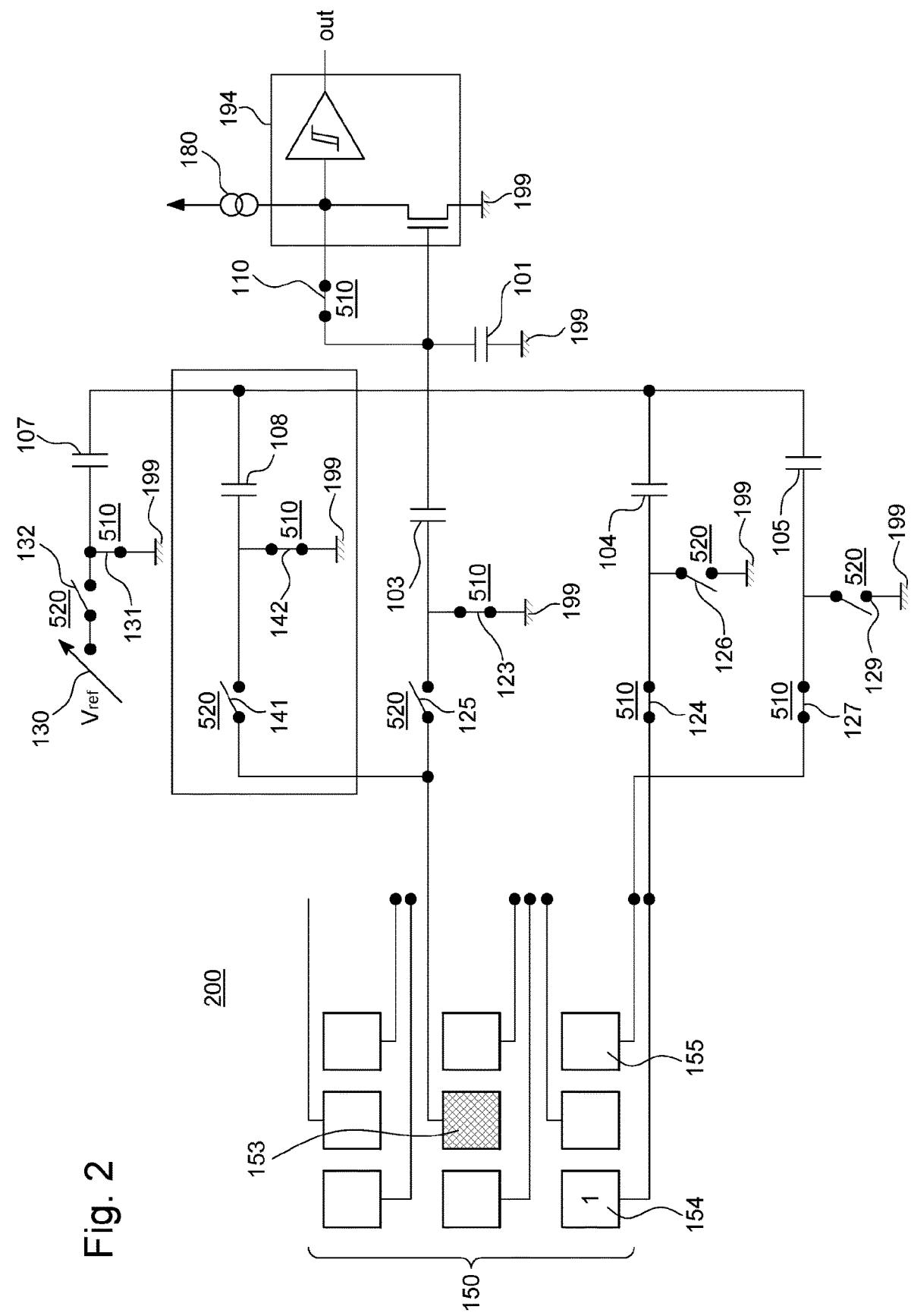
FIG. 2 represents at least one reset phase 510 which sets a primary charge $q_{510}$ on said amplifier 190; and, FIG. 3 shows at least one comparison phase 520 which sets a secondary charge $q_{520}$ on said amplifier 190.

Said method 500 comprises at least one reset phase 510, which sets a primary charge $q_{510}$ on said amplifier 190 by switching said at least one main switching element 110 and said plurality of auxiliary switching elements 120, as illustrated in FIG. 2.

Indeed, as depicted in FIG. 1, said plurality of storage elements 100 comprises at least one main source 180, at least one main storage element 101, which may be a main capacitor $C_{101}$, at least one main switching element 110 which may connect said at least one main storage element 101 to said at least one main source 180 when said at least one reset phase 510 may occur.

Said plurality of storage elements 100 may comprise at least one primary auxiliary storage element 103, at least one secondary auxiliary storage element 104, and at least one tertiary auxiliary storage element 105, and said plurality of auxiliary switching elements 120 may comprise at least one first primary auxiliary switching element 123, at least one second primary auxiliary switching element 125, at least one first secondary auxiliary switching element 124, at least one second secondary auxiliary switching element 126, at least one first tertiary auxiliary switching element 127 and at least one second tertiary auxiliary switching element 129.

More specifically, said at least one primary auxiliary storage element 103 may be connected to said ground 199 via said at least one first primary auxiliary switching element 123 and to said plurality of auxiliary source 150, preferably to a primary auxiliary pixel 153 or a primary auxiliary photodetector 153, via at least one second primary auxiliary switching element 125. In parallel to said at least one primary auxiliary storage element 103, said plurality of storage elements 100 may comprise at least one offset storage element 107 and at least one trim storage element 108. Said at least one offset storage element 107 may be connected to said ground 199 via at least one first offset switching element 131 and to at least one offset source 130 via at least one at least one second offset switching element 132, so an offset may be adjusted thanks to at least one offset source 130, and said at least one trim storage element 108, so a gain may be adjusted, may be connected to said ground 199 via at least one first trim switching element 141 and to said plurality of auxiliary source 150 via at least one second trim switching element 142.

Similarly to said at least one primary auxiliary storage element 103, said at least one secondary auxiliary storage element 104 and said at least one tertiary auxiliary storage element 105 may be connected to said ground 199 via at least one second secondary auxiliary switching element 126 and via at least one second tertiary auxiliary switching element 129 respectively, and on other side, said at least one secondary auxiliary storage element 104 and said at least one tertiary auxiliary storage element 105 may be connected to said plurality of auxiliary source 150, more precisely to a secondary auxiliary pixel 154 or a secondary auxiliary photodetector 154 and a tertiary auxiliary pixel 155 or a tertiary auxiliary photodetector 155 respectively, via at least one first secondary auxiliary switching element 124 and at least one first tertiary auxiliary switching element 127 respectively.

When said at least one reset phase 510 may occur, said at least one main storage element 101, which may be at least one main storage capacitor $C_{101}$, may be connected to said at least one main source 180 via said at least one main switching element 110, said at least one offset storage element 107, which may be at least one offset storage capacitor $C_{107}$, may be connected to said ground 199 via at least one first offset switching element 131, said at least one trim storage element 108, which may be at least one trim storage capacitor $C_{108}$, may be connected to said ground 199 via at least one first trim switching element 141, said at least one primary auxiliary storage element 103, which may be at least one primary auxiliary storage capacitor $C_{103}$, may be connected to said ground 199 via said at least one first primary auxiliary switching element 123, said at least one secondary auxiliary storage element 104 and said at least one tertiary auxiliary storage element 105, which may be at least one secondary auxiliary storage capacitor $C_{104}$ and at least one tertiary auxiliary storage capacitor $C_{105}$ respectively, may be connected to said plurality of auxiliary source 150, more precisely to a secondary auxiliary pixel 154 or a secondary auxiliary photodetector 154 and a tertiary auxiliary pixel 155 or a tertiary auxiliary photodetector 155 respectively, via at least one first secondary auxiliary switching element 124 and at least one first tertiary auxiliary switching element 127 respectively.

In this configuration, since said plurality of storage element 100 are connected together, said primary charge $q_{510}$ may be set on said amplifier 190, as follow:

$$q_{510}=C_{101}V_{510}+C_{107}V_{510}+C_{108}V_{510}+C_{103}V_{510}+C_{104}(V_{510}-V_{154})+C_{105}(V_{510}-V_{155})$$

$$q_{510}=V_{510}(C_{101}+C_{107}+C_{108}+C_{103}+C_{104}+C_{105})-C_{104}V_{154}-C_{105}V_{155}$$

With $V_{510}$ being the tension set on said amplifier 190, $V_{154}$ and $V_{155}$ being the tension on said secondary auxiliary pixel 154 and on said tertiary auxiliary pixel 155 respectively during said at least one reset phase 510.

Figure 3:
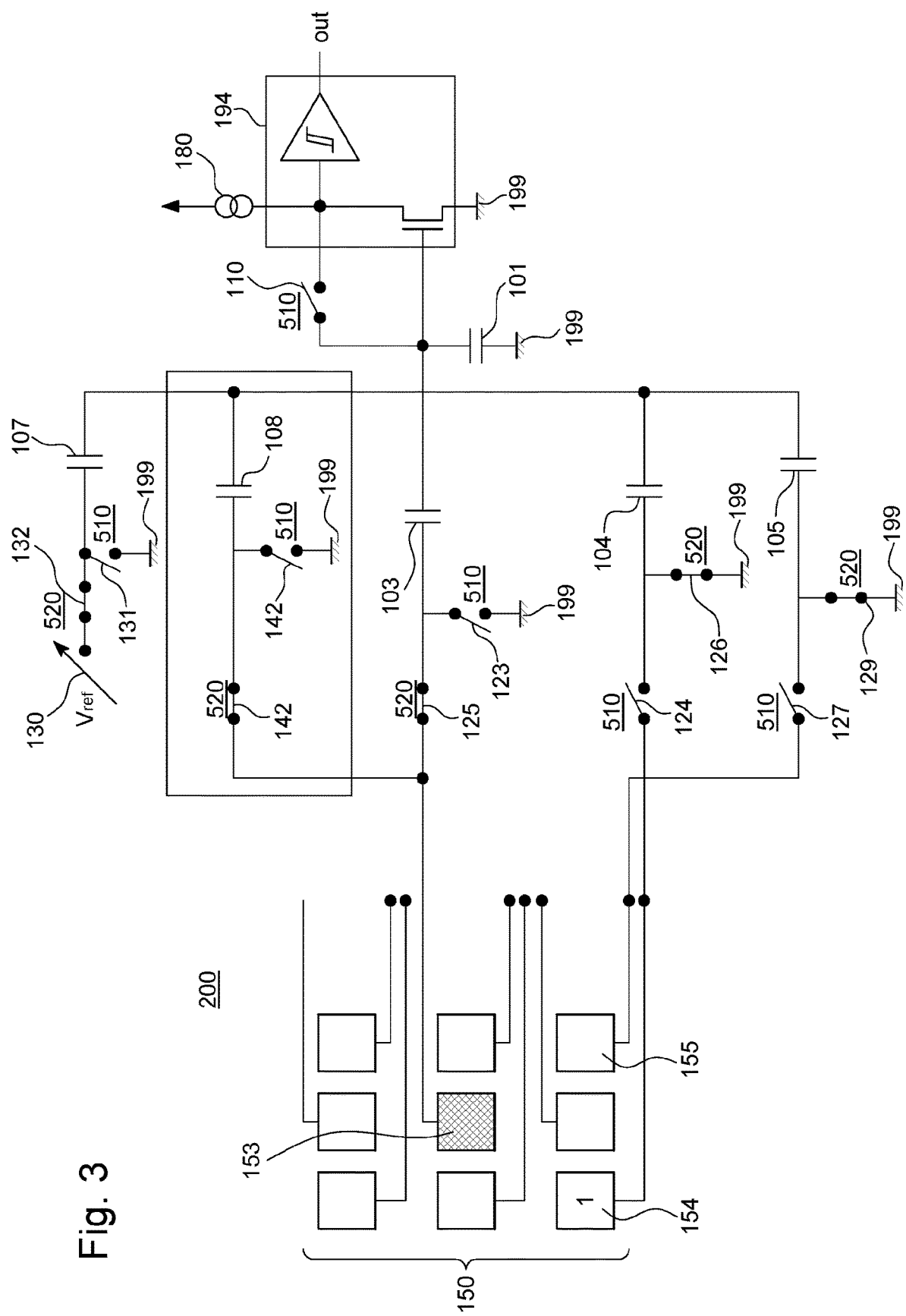

As depicted in FIG. 3, thereafter, said at least one comparison phase 520 may occur and said at least one main storage element 101 may be disconnected from said at least one main source 180 via said at least one main switching element 110, said at least one offset storage element 107 may be disconnected from said ground 199 via at least one first offset switching element 131 and connected to said at least one offset source 130 via at least one at least one second offset switching element 132, said at least one trim storage element 108 may be disconnected from said ground 199 via at least one first trim switching element 141 and connected to said primary auxiliary pixel 153 via at least one second trim switching element 142, said at least one primary auxiliary storage element 103 may be disconnected to said ground 199 via said at least one first primary auxiliary switching element 123 and connected to said primary auxiliary switching element 125, said at least one secondary auxiliary storage element 104 and said at least one tertiary auxiliary storage element 105 may be disconnected from said secondary auxiliary pixel 154 and said tertiary auxiliary pixel 155 respectively, via at least one first secondary auxiliary switching element 124 and at least one first tertiary auxiliary switching element 127 respectively and may be connected to said ground 199 via said at least one second secondary auxiliary switching element 126 and said at least one second tertiary auxiliary switching element 129.

In this configuration, said secondary charge $q_{520}$ may be equal to:

$$q_{520}=C_{101}V_{520}+C_{107}(V_{520}-V_{130})+C_{108}(V_{520}-V_{153})+C_{103}(V_{520}-V_{153})+C_{104}V_{520}+C_{105}V_{520}$$

$$q_{520}=V_{520}(C_{101}+C_{107}+C_{108}+C_{103}+C_{104}+C_{105})-C_{107}V_{130}-C_{108}V_{153}-C_{103}V_{153}$$

With $V_{520}$ being the tension on set on said amplifier 190, $V_{153}$ being the tension on said primary auxiliary pixel 153 and $V_{130}$ being the tension on said at least one offset source 130 during said at least one comparison phase 520.

Since the switch between said at least one reset phase 510 and said at least one comparison phase 520, said primary charge $q_{510}$ become a reference for said amplifier 190, and said at least one comparison phase 520 may compare said secondary charge 8520 and said primary charge $q_{510}$, as follow:

$$V_{520}-V_{510}=\frac{C_{108}+C_{103}}{C_{101}+C_{107}+C_{108}+C_{103}+C_{104}+C_{105}-C_{105}V_{155}}V_{153}+C_{104}V_{154}$$

If $C_{103}+C_{108}$, $C_{104}$ and $C_{105}$ are selected with these values:

$$C_{108}+C_{103}=C_{104}+C_{105}=2C \text{ and } C_{104}=C_{105}=C,$$

the equation may be rewritten, as follow:

$$V_{520}-V_{510}=k_1\left(V_{153}-\frac{V_{154}+V_{155}}{2}\right)+k_2V_{130}$$

$$\text{With } k_1=\frac{2C}{C_{101}+C_{107}+2C+2C}$$

$$\text{And } k_2=\frac{C_{107}}{C_{101}+C_{107}+2C+2C}$$

As it may be observed from said comparison phase 520 that voltage $V_{153}$ of said at least one primary auxiliary storage element 103 is compared to average voltage of said at least one secondary auxiliary storage element 104 and at least one tertiary auxiliary storage element 105 plus an offset defined by $V_{130}$ and $V_{153}$.

$$V_{153} \geq V_{154}+V_{155}/2 \Rightarrow V_{520}-V_{510}>0$$

So secondary charge $q_{520}$ increases in said at least one comparison phase 520 versus primary charge $q_{510}$ in said at least one reset phase 510.

$$V_{153} \leq V_{154}+V_{155}/2 \Rightarrow V_{520}-V_{510}<0$$

So secondary charge $q_{520}$ decreases in said at least one comparison phase 520 versus primary charge $q_{510}$ in said at least one reset phase 510.

Of course, the concept may be extended by duplicating the number of capacitances: for instance, we can use four capacitances instead of only two pixels and connect to pixels located around said primary auxiliary pixel 153. We have then four unit capacitances connected to neighbor pixels and said primary auxiliary pixel 153 has to be connected to four unit capacitances as well.

Thanks to the present invention, said method 500 may compare a plurality of storage elements of a pointing device such as to reveal interesting information when surface local non-uniformity is smaller than the spot gradient and may generate dynamics edges, such as to recognize a moving image and thus improve mouse displacement evaluation.

The invention claimed is:

1. A method for comparing a plurality of storage elements of a pointing device; the pointing device comprising a ground, an amplifier, a plurality of auxiliary sources, at least one main switching element, and a plurality of auxiliary switching elements; the plurality of storage elements being configured to be connected to the ground, at least one main source and a plurality of auxiliary sources via one of the at least one main switching element and the plurality of auxiliary switching elements; the method comprising:
   a reset phase configured to set a primary charge on the amplifier by switching the at least one main switching element and the plurality of auxiliary switching elements; and
   a comparison phase configured to set a secondary charge on the amplifier by switching the at least one main switching element and the plurality of auxiliary switching elements, and to compare the secondary charge and the primary charge.

2. The method according to claim 1, wherein the plurality of storage elements comprises at least one main storage element, and the pointing device comprises at least one main source, at least one main switching element being configured to connect the at least one main storage element to the at least one main source; wherein the reset phase is configured to switch the at least one main switching element such as to connect the at least one main storage element to the at least one main source.

3. The method according to claim 1, wherein the plurality of storage elements comprises at least one primary auxiliary storage element, at least one secondary auxiliary storage element, and wherein the plurality of auxiliary switching elements comprises at least one first primary auxiliary switching element configured to connect the at least one primary auxiliary storage element to the ground, at least one first secondary auxiliary switching element configured to connect the at least one secondary auxiliary storage element to the plurality of auxiliary sources; wherein the reset phase is configured to switch at least one first primary auxiliary switching element such as to connect the at least one primary auxiliary storage element to the ground, and the at least one first secondary auxiliary switching element such as to connect the at least one secondary auxiliary storage element to the plurality of auxiliary sources.

4. The method according to claim 2, wherein the comparison phase is configured to switch the at least one main switching element such as to disconnect the at least one main storage element of the at least one main source.

5. The method according to claim 3, wherein the plurality of auxiliary switching elements comprises at least one second primary auxiliary switching element configured to connect the at least one primary auxiliary storage element to the plurality of auxiliary sources, at least one second secondary auxiliary switching element configured to connect the at least one secondary auxiliary storage element to the ground; wherein the comparison phase is configured to switch the at least one second primary auxiliary switching element such as to connect the at least one primary auxiliary storage element to the plurality of auxiliary sources, and the at least one second secondary auxiliary switching element such as to connect the at least one secondary auxiliary storage element to the ground.

6. The method according to claim 1, wherein the plurality of storage elements comprises at least one tertiary auxiliary storage element, and wherein the plurality of auxiliary switching elements comprises at least one first tertiary auxiliary switching element configured to connect the at least one tertiary auxiliary storage element to the plurality of auxiliary sources; wherein the reset phase is configured to switch the at least one first tertiary auxiliary switching element such as to connect the at least one tertiary auxiliary storage element to the plurality of auxiliary sources.

7. The method according to claim 6, wherein the plurality of auxiliary switching elements comprises at least one second tertiary auxiliary switching element configured to connect the at least one tertiary auxiliary storage element to the ground; wherein the comparison phase is configured to switch the at least one second tertiary auxiliary switching element such as to connect the at least one tertiary auxiliary storage element to the ground.

8. The method according to claim 1, wherein
   the plurality of storage elements comprises at least one main storage element, at least one primary auxiliary storage element, at least one secondary auxiliary storage element and at least one tertiary auxiliary storage element, and
   the reset phase is configured to sum the charge of the at least one primary auxiliary storage element, charge of one of the at least one secondary auxiliary storage element, charge of the at least one tertiary auxiliary storage element, and charge of the at least one main storage element such as to set the primary charge on the amplifier.

9. The method according to claim 2, wherein the plurality of storage elements comprises at least one primary auxiliary storage element, at least one secondary auxiliary storage element and at least one tertiary auxiliary storage element, and the comparison phase is configured to add up charge of the at least one primary auxiliary storage element, charge of the at least one secondary auxiliary storage element, charge of the at least one tertiary auxiliary storage element and charge of the at least one main storage element such as to compare the secondary charge and primary charge by applying the secondary charge on the amplifier.

10. The method according to claim 1, wherein the plurality of storage elements comprises at least one offset storage element and at least one trim storage element, and the pointing device comprises at least one first offset switching element configured to connect the at least one offset storage element to the ground and at least one first trim switching element configured to connect the at least one trim storage element to the ground; wherein the reset phase is configured to switch the at least one first offset switching element such as to connect the at least one offset storage element to the ground and the at least one first trim switching element such as to connect the at least one trim storage element to the ground.

11. The method according to claim 1, wherein the pointing device comprises at least one offset source, at least one second offset switching element configured to connect the at least one offset storage element to the at least one offset source and at least one second trim switching element configured to connect the at least one trim storage element to the plurality of auxiliary sources; wherein the reset phase switches the at least one second offset switching element such as to connect the at least one offset storage element to the at least one offset source and the at least one second trim switching element such as to connect the at least one trim storage element to the plurality of auxiliary sources.

* * * * *